(12) United States Patent
Wu et al.

(10) Patent No.: US 8,258,770 B2
(45) Date of Patent: Sep. 4, 2012

(54) MULTI-PHASE VOLTAGE REGULATOR MODULE AND METHOD CONTROLLING THE SAME

(75) Inventors: Chao-Chung Wu, Taipei (TW); Chi-Pen Chi, Taipei (TW); Yu-Chen Lee, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 520 days.

(21) Appl. No.: 12/504,215

(22) Filed: Jul. 16, 2009

(65) Prior Publication Data

US 2010/0033151 A1    Feb. 11, 2010

(30) Foreign Application Priority Data

Aug. 11, 2008    (TW) ................................ 97130582 A

(51) Int. Cl.
*G05F 1/40* (2006.01)
(52) U.S. Cl. ..................................... 323/285
(58) Field of Classification Search .......... 323/222–225, 323/268, 271, 282, 284, 285
See application file for complete search history.

(56) References Cited

U.S. PATENT DOCUMENTS

| 5,479,089 | A | 12/1995 | Lee |
| 6,674,274 | B2 * | 1/2004 | Hobrecht et al. ............. 323/285 |
| 6,803,752 | B1 * | 10/2004 | Chen ............................ 323/282 |
| 7,109,694 | B2 | 9/2006 | Mihalka |
| 2004/0196019 | A1 | 10/2004 | Schneider |
| 2005/0001597 | A1 | 1/2005 | Walters et al. |

* cited by examiner

*Primary Examiner* — Matthew Nguyen
(74) *Attorney, Agent, or Firm* — Jianq Chyun IP Office

(57) ABSTRACT

A multi-phase voltage regulator module connects to a central processing unit and is able to operate in one of a high-load mode and a low-load mode. The multi-phase voltage regulator module comprises: a pulse-width-modulation controller generating a plurality of phase-width-modulation signals; and, a plurality of phase circuits, each of which receives a corresponding one of the phase-width-modulation signals and generates a corresponding output current to the central processing unit; wherein a first portion of the phase circuits are activated when the multi-phase voltage regulator module is operated in the low-load mode at a first time, and, a second portion of the phase circuits are activated when the multi-phase voltage regulator module is operated in the low-load mode at a second time, the first portion being non-identical to the second portion.

14 Claims, 5 Drawing Sheets

MULTI-PHASE VOLTAGE REGULATOR MODULE AND METHOD CONTROLLING THE SAME

FIELD OF THE INVENTION

The present invention relates to a multi-phase voltage regulator module (VRM), and more particularly to a multi-phase VRM capable of operating with a variable active or inactive phase number.

BACKGROUND OF THE INVENTION

Basically, the central processing unit (CPU) of a computer system is not directly powered by a power supply. Because the intensity of the core voltage (Vcore) required by the CPU is varied with the actual load of the CPU, the intensity of the core voltage (Vcore) may change vary sharply according to the extremely heavy load or the extremely light load on the CPU. Voltage regulator module (VRM) is very widely equipped with the computer system for providing the core voltage (Vcore) to the CPU due to the VRM is designed to quickly provide the core voltage (Vcore) according to the requirement of the CPU.

FIG. 1 is a functional block diagram depicting a conventional single-phase VRM. The single-phase VRM comprises a pulse-width-modulation (PWM) controller 10, a PWM driver 12, and a PWM circuit 14, where a PWM signal is transmitted to the PWM driver 12 from the PWM controller 10.

Furthermore, the PWM driver 12 comprises a steering logic circuit 16 and two driving circuits 18 and 20. A first signal and a second signal are transmitted to the two driving circuits (18, 20) respectively from the steering logic circuit 16 according to the PWM signal. A first driving signal (S1) is outputted from the driving circuit 18 according to the first signal. A second driving signal (S2) is outputted from the driving circuit 20 according to the second signal.

Furthermore, the PWM circuit 14 comprises a upper power field effect transistor (FET) (M1), a lower power FET (M2), an output choke (L), a current sense resistor (Rs), and a output capacitor (Co), where the upper power FET (M1) and the lower power FET (M2) is a n-type FET. The upper power FET (M1) comprises a drain (D) connected to a voltage source (Vcc, +12V); a gate (G) to which the first driving signal (S1) is inputted; a source (S) is connected to a first end of the output choke (L). The lower power FET (M2) comprises a drain (D) connected to the first end of the output choke (L); a gate (G) to which the second driving signal (S2) is inputted; a source (S) is connected to ground (GND). The current sense resistor (Rs) is coupled between a second end of the output choke (L) and a Vcore-output end from which the core voltage (Vcore) is outputted. The output capacitor (Co) is coupled between the Vcore-output end and ground (GND). The current sense resistor (Rs), the output choke (L), and the output capacitor (Co) are combined as a RLC circuit.

Furthermore, the Vcore-output end is connected to a power layer of a motherboard (not shown), and the power layer is further connected to the CPU for providing the Vcore voltage to the CPU.

Via the first driving signal (SI) and the second driving signal (S2) respectively applied to the upper power FET (M1) and the lower power FET (M2), an output current (Io), originally from the voltage source (Vcc, +12V), is resulted in and outputted to the CPU from the Vcore-output end sequentially via the output choke (L) and the current sense resistor (Rs). Because the intensity of the output current (Io) is proportional to the load of the CPU, the operation mode of the CPU can be determined according to the intensity of the output current (Io), and the conventional single-phase VRM can dynamically modulate the output current (Io) to the CPU according to the operation mode of the CPU. If the CPU is operated in a heavy-load mode, the sense voltage (Vs) on the current sense resistor (Rs) is accordingly relative high. The relative high sense voltage (Vs) is then detected by a feedback logic circuit 21 arranged in the PWM controller 10. Then, a PWM signal with wider pulse widths, for informing the PWM driver 12 and the PWM circuit 14 to output a relative large output current (Io), is transmitted to the PWM driver 12 from the PWM controller 10. Alternatively, if the CPU is operated in a light-load mode, the sense voltage (Vs) on the current sense resistor (Rs) is accordingly relative low. The relative low sense voltage (Vs) is then detected by the feedback logic circuit 21. Then, a PWM signal with narrower pulse widths, for informing the PWM driver 12 and the PWM circuit 14 to output a relative small output current (Io), is transmitted to the PWM driver 12 from the PWM controller 10.

A single-phase VRM means a VRM is constituted by only one PWM driver 12 and only one PWM circuit 14. Accordingly, a multi-phase VRM means a VRM is constituted by more than one PWM drivers and corresponding number of PWM circuits. Because the CPU today consumes more and more power, the multi-phase VRM capable of providing a stable core voltage (Vcore) is more commonly used on the motherboard.

FIG. 2 is a functional block diagram depicting a conventional eight-phase VRM. The eight-phase VRM comprises a PWM controller 22, eight PWM drivers (24, 26, 28, 30, 32, 34, 36, 38), and eight PWM circuits (40, 42, 44, 46, 48, 50, 52, 54). Furthermore, each PWM circuit (40, 42, 44, 46, 48, 50, 52, 54) comprises two power FETs (M1, M2) and a RLC circuit. Furthermore, the eight PWM signals (PWM1~PWM8) are respectively transmitted to the eight PWM drivers (24, 26, 28, 30, 32, 34, 36, 38) from the PWM controller 22.

Furthermore, the eight PWM drivers (24, 26, 28, 30, 32, 34, 36, 38) and the eight PWM circuits (40, 42, 44, 46, 48, 50, 52, 54) respectively constitute eight phase circuits (210, 220, 230, 240, 250, 260, 270, 280), where each of the phase circuit (210, 220, 230, 240, 250, 260, 270, 280) comprises a Vcore-output end connected to a power layer of the motherboard (not shown) for providing the core voltage (Vcore) to the CPU. As described above, the output currents (Io) outputted to the CPU from the eight phase circuits (210, 220, 230, 240, 250, 260, 270, 280) are respectively controlled by the eight PWM signals (PWM1~PWM8). Furthermore, the current, consumed by the CPU and is named CPU current (I_CPU), is the sum of the eight output currents (Io) outputted from the eight phase circuits (210, 220, 230, 240, 250, 260, 270, 280). Furthermore, the function of the eight PWM drivers (24, 26, 28, 30, 32, 34, 36, 38) is exactly same as the PWM driver 12 (FIG. 1). The function of the eight PWM circuits (40, 42, 44, 46, 48, 50, 52, 54) is exactly same as the PWM circuit 14 (FIG. 1).

With the increasing number of phases in the multi-phase VRM, the reliability and the stability of the operating frequency and the core voltage of the CPU are accordingly secured. However, more phases in a multi-phase VRM also brings more unnecessary power waste due to the impedance factor resulted in the multi-phase VRM itself. Moreover, according to the related research, the efficiency is relative low if the multi-phase VRM is operated at a relative light load.

FIG. 3A is a scheme illustrating an efficiency curve of a conventional multi-phase VRM (only a VRM switched to operate between four phases and eight phases is took as an example). As depicted in FIG. 3A, an optimal efficiency is obtained if all the eight phases are active for providing the eight output currents (Io) to the CPU when the CPU is operated at a heavy load (I-CPU greater than I_CPUref) but only the four phases are active for providing four output currents (Io) to the CPU when the CPU is operated at a light load (I-CPU less than I_CPUref), where the I_CPUref stands for a predefined reference CPU current.

To aware of the present operation load of the CPU via comparing the CPU current (I_CPU) with the reference CPU current (I_CPUref), a load detect circuit, usually implemented by a comparator, is introduced in the conventional multi-phase VRM. FIG. 3B is a scheme illustrating the load detect circuit (comparator) adopted in the conventional multi-phase VRM. First, the real CPU current (I_CPU) on the CPU and the predefined reference CPU current (I_CPUref) are proportionally converted to voltages, and the two voltages are then transmitted to two input ends (Iin+ and Iin−) of the load detect circuit (comparator) 100. After the real CPU current (I_CPU) on the CPU is compared with the predefined reference CPU current (I_CPUref), a logic-low signal is outputted from an output end (O) of the load detect circuit (comparator) 100 if the real CPU current (I_CPU) consumed by the CPU is greater than the predefined reference CPU current (I_CPUref); or, a logic-high signal is outputted from the output end (O) of the load detect circuit (comparator) 100 if the real CPU current (I_CPU) consumed by the CPU is less than the predefined reference CPU current (I_CPUref). Afterwards, a specific number of active phases, for providing the output currents (Io) to the CPU, can be determined based on the logic signal outputted from the load detect circuit (comparator) 100. For example, if the CPU is detected to operate in a heavy-load mode by the load detect circuit 100, a logic-low signal is outputted from an output end (O) of the load detect circuit (comparator) 100, accordingly all the eight PWM signals (PWM1~PWM8) are outputted to the eight phase circuits (210, 220, 230, 240, 250, 260, 270, 280) respectively from the PWM controller 22 (FIG. 2), so as all the eight phase circuits (210, 220, 230, 240, 250, 260, 270, 280) are active for providing eight output currents (Io) to the CPU. Alternatively, if the CPU is detected to operate in a light-load mode by the load detect circuit 100, a logic-high signal is outputted from the output end (O) of the load detect circuit (comparator) 100, accordingly only the first four PWM signals (PWM1~PWM4) are outputted to the four phase circuits (210, 220, 230, 240) respectively from the PWM controller 22 (FIG. 2), so as only the first four phase circuits (210, 220, 230, 240) are active for providing four output currents (Io) to the CPU.

Because the first four phase circuits (210, 220, 230, 240) are always active no matter the CPU is determined to operate either in the heavy-load mode or the light-load mode, apparently the life hour of the devices in the first four phase circuits (210, 220, 230, 240) is shorter than that in the last four phase circuits (250, 260, 270, 280) after a long term.

SUMMARY OF THE INVENTION

Therefore, the present invention relates to a multi-phase VRM having a balance life hour of devices in each phase circuit.

The present invention provides a multi-phase voltage regulator module connected to a central processing unit and operated in one of a high-load mode and a low-load mode, comprising: a pulse-width-modulation controller generating a plurality of phase-width-modulation signals; and a plurality of phase circuits, each of which receives a corresponding one of the phase-width-modulation signals and generates a corresponding core voltage to the central processing unit; wherein a first portion of the phase circuits are activated when the multi-phase voltage regulator module is operated in the low-load mode at a first time, and, a second portion of the phase circuits are activated when the multi-phase voltage regulator module is operated in the low-load mode at a second time, the first portion being non-identical to the second portion.

The present invention provides a controlling method applied to a multi-phase voltage regulator module having a plurality of phase circuits connected to a central processing unit and capable of operating in one of a high-load mode and a low-load mode, the controlling method comprising steps of: activating a first portion of the phase circuits when the multi-phase voltage regulator module is operated in the low-load mode at a first time; and activating a second portion of the phase circuits when the multi-phase voltage regulator module is operated in the low-load mode at a second time; wherein the first portion is non-identical to the second portion.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
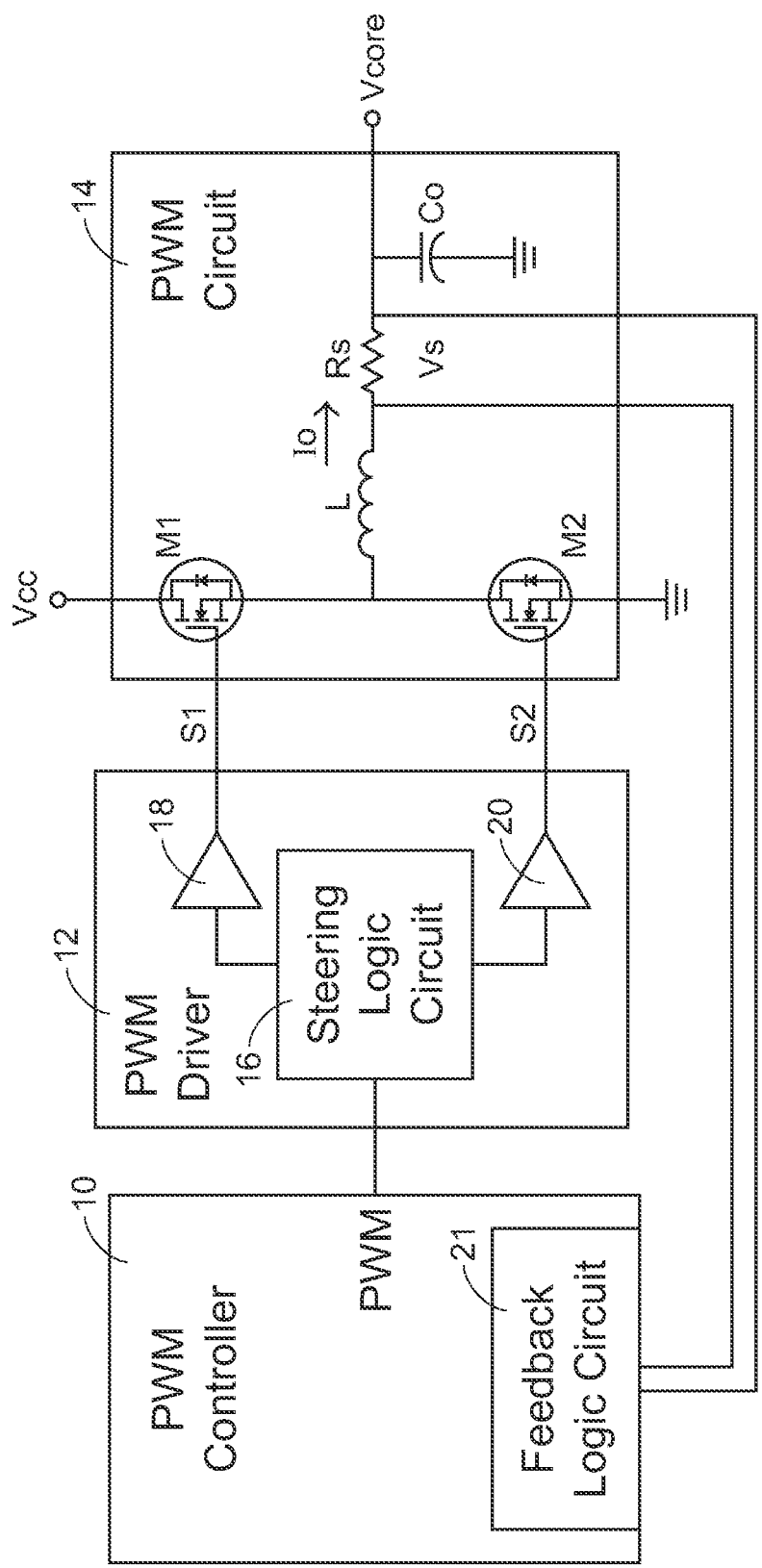
FIG. 1 is a functional block diagram illustrating a conventional single-phase VRM.
Figure 2:
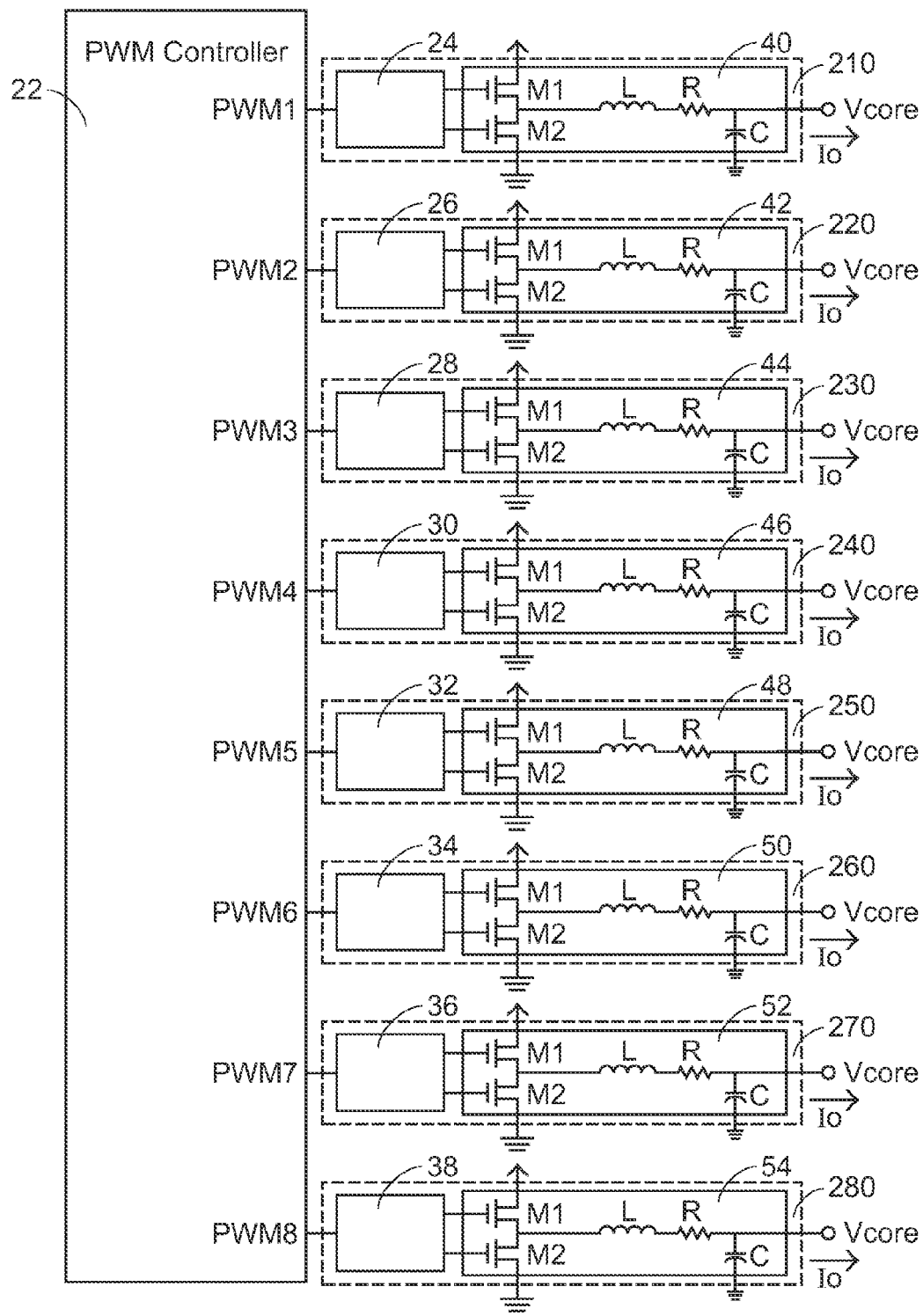
FIG. 2 is a functional block diagram illustrating a conventional eight-phase VRM.
Figure 3A:
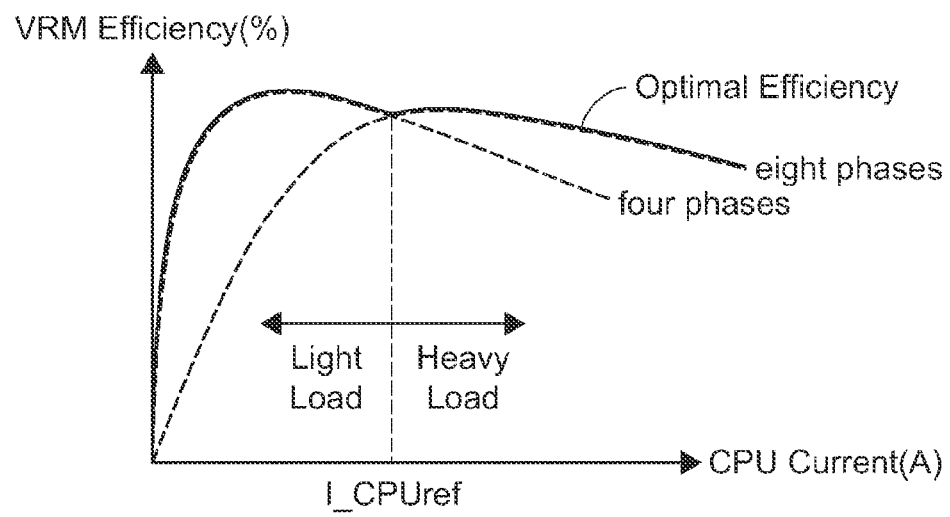
FIG. 3A is schematically illustrates an efficiency curve of a conventional VRM (only a VRM switching between four phases and eight phases is took as an example)
Figure 3B:
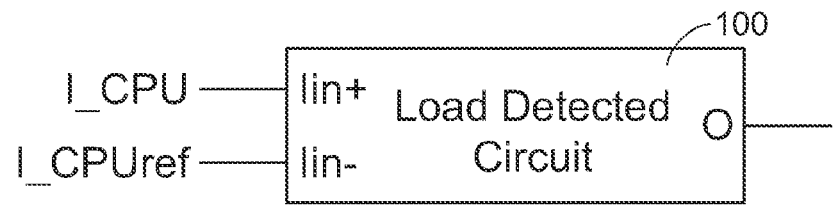
FIG. 3B is a functional block diagram illustrating a comparator adopted in the conventional multi-phase VRM.
Figure 4:
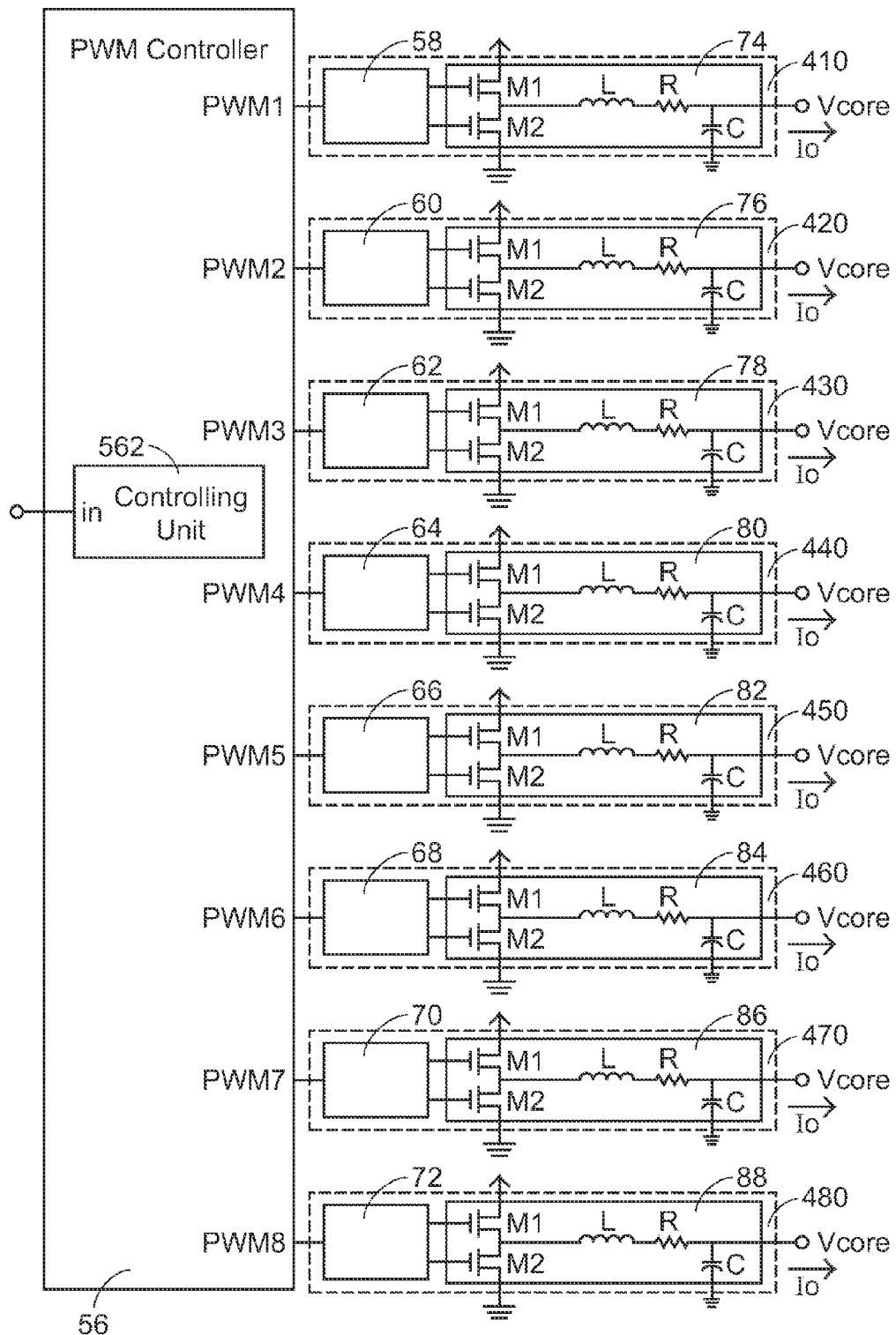
FIG. 4 is a functional block diagram illustrating a first embodiment of a multi-phase VRM of the present invention.

FIG. 4 is a functional block diagram depicting a multi-phase VRM of a first embodiment of the present invention (only an eight-phase VRM is took as an example). The eight-phase VRM comprises a PWM controller 56, eight PWM drivers (58, 60, 62, 64, 66, 68, 70, 72), and eight PWM circuits (74, 76, 78, 80, 82, 84, 86, 88). Furthermore, each of the PWM circuit (74, 76, 78, 80, 82, 84, 86, 88) comprises two power FETs (M1, M2) and a RLC circuit. Furthermore, eight PWM signals (PWM1~PWM8) are transmitted to the eight PWM drivers (58, 60, 62, 64, 66, 68, 70, 72) respectively from the PWM controller 56. Furthermore, the PWM controller 56 comprises a controlling unit 562 having an input end (in) connected to an output end of a load detect circuit (not shown), where the controlling unit 562 is used for outputting a phase-control signal to determine whether outputting the eight PWM signals (PWM1~PWM8) or not.

Furthermore, the eight PWM drivers (58, 60, 62, 64, 66, 68, 70, 72) and the eight PWM circuits (74, 76, 78, 80, 82, 84, 86, 88) are respectively combined as the eight phase circuits (410, 420, 430, 440, 450, 460, 470, 480), where each of the phase circuit (410, 420, 430, 440, 450, 460, 470, 480) comprises a Vcore-output end from which an output current (Io) is outputted to the CPU.

In the first embodiment of the present invention, if the CPU is detected to operate in a heavy-load mode by the load detect circuit and accordingly all the eight phase circuits (410, 420, 430, 440, 450, 460, 470, 480) are necessary to be activated for outputting eight output currents (Io) to the CPU, the controlling unit 562 then informs the PWM controller 56 to output all the eight PWM signals (PWM1~PWM8). After the eight PWM signals (PWM1~PWM8) are respectively outputted to the eight PWM drivers (58, 60, 62, 64, 66, 68, 70, 72), accordingly the eight output currents (Io) are outputted to the CPU from the eight PWM circuits (74, 76, 78, 80, 82, 84, 86, 88).

Alternatively, if the CPU is detected to operate in a light-load mode by the load detect circuit and accordingly only four of the eight phase circuits (410, 420, 430, 440, 450, 460, 470, 480) needed to be activated, the controlling unit 562 then informs the PWM controller 56 to output specific four PWM signals to the corresponding four PWM drivers. In the first embodiment, the first four PWM signals (PWM1, PWM2, PWM3, PWM4) will be transmitted to the corresponding first four PWM drivers (58, 60, 62, 64) from the PWM controller 56 if the CPU is first time operated in the light-load mode. After the first four PWM signals (PWM1, PWM2, PWM3, PWM4) are transmitted to the corresponding first four PWM drivers (58, 60, 62, 64), the four output currents (Io) are then outputted to the CPU. To sum up, the first four phase circuits (410, 420, 430, 440) are activated and the last four phase circuits (450, 460, 470, 480) are inactivated in the first embodiment when the CPU is detected to operate in the light-load mode first time.

Next time when the CPU is detected to operate in a light-load mode again by the load detect circuit and accordingly only four of the eight phase circuits (410, 420, 430, 440, 450, 460, 470, 480) needed to be activated, the controlling unit 562 then informs the PWM controller 56 to output specific four PWM signals to the corresponding four PWM drivers. In the first embodiment, the last four PWM signals (PWM5, PWM6, PWM7, PWM8) will be transmitted to the corresponding last four PWM drivers (66, 68, 70, 72) from the PWM controller 56 if the CPU is second time operated in the light-load mode. After the last four PWM signals (PWM5, PWM6, PWM7, PWM8) are transmitted to the corresponding last four PWM drivers (66, 68, 70, 72), the four output currents (Io) are then outputted to the CPU. To sum up, the last four phase circuits (450, 460, 470, 480) are activated and the first four phase circuits (410, 420, 430, 440) are inactivated in the first embodiment when the CPU is detected to operate in the light-load mode second time.

Therefore, the first group of phase circuits (410, 420, 430, 440) and the second group of phase circuits (450, 460, 470, 480) can take turns to be activated if the eight-phase VRM of the first embodiment of the present invention is operated in the light-load mode, so as the balance of the life hour of the devices in the eight phase circuits (410, 420, 430, 440, 450, 460, 470, 480) is achieved.

Figure 5:
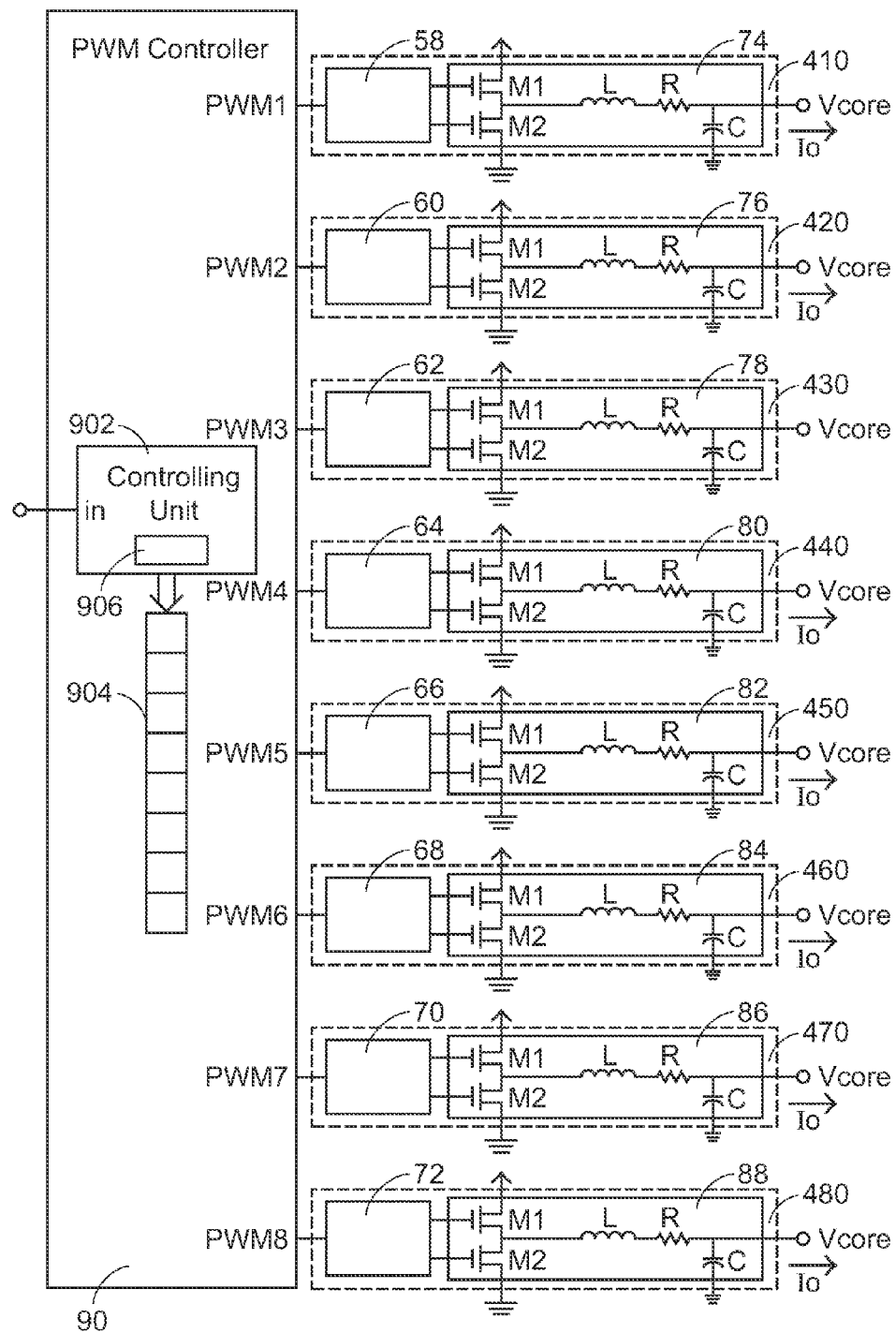
FIG. 5 is a functional block diagram illustrating a second embodiment of a multi-phase VRM of the present invention.

Furthermore, the selection of the PWM signals can be randomly determined by another mechanism. FIG. 5 is a functional block diagram depicting a multi-phase VRM of a second embodiment of the present invention (only an eight-phase VRM is took as an example). Except replacing the PWM controller 56 (FIG. 4) by a PWM controller 90, all the rest circuits in the FIG. 5 are exactly same as the rest circuits in FIG. 4. The PWM controller 90 comprises a controlling unit 902 and an 8-bit register 904. The controlling unit 902, comprising an input end (in) connected to an output end of a load detect circuit (not shown), is used for outputting a phase-control signal for updating the value stored at the 8-bit register 904 based on the signal received at the input end (in). Furthermore, the value stored at the 8-bit register 904 is used for determining the outputting/or not outputting of the eight PWM signals (PWM1~PWM8). Furthermore, the controlling unit 902 comprises a random-number generator 906.

In the second embodiment of the present invention, if the CPU is detected to operate in a heavy-load mode by the load detect circuit via the signal at the input end (in) and accordingly all the eight phase circuits (410, 420, 430, 440, 450, 460, 470, 480) are necessary to be activated for outputting eight output currents (Io) to the CPU, the controlling unit 902 then outputs a 8-bit phase control signal (constructed by eight bit "1") to inform the PWM controller 90 to output all the eight PWM signals (PWM1~PWM8). After the eight PWM signals (PWM1~PWM8) are respectively outputted to the eight PWM drivers (58, 60, 62, 64, 66, 68, 70, 72), accordingly the eight output currents (Io) are outputted to the CPU from the eight PWM circuits (74, 76, 78, 80, 82, 84, 86, 88).

Alternatively, if the CPU is detected to operate in a light-load mode by the load detect circuit and only four phase circuits are necessary to be to active, the controlling unit 902 then informs the random-number generator 906 to generate a random 8-bit phase control signal (constructed by four bit "1" and four bit "0") to the register 904. After the 8-bit phase control signal (e.g., (0110, 1001)) is generated and transmitted to the register 904, the corresponding four PWM signals (PWM2, PWM3, PWM5, PWM8) are then outputted from the PWM controller 90, so as the corresponding four phase circuits (420, 430, 450, 480) are active for providing the four output currents (Io) to the CPU. Next time, when the CPU is detected to operate in the light-load mode again and only four phase circuits are necessary to be activated, the controlling unit 902 then informs the random-number generator 906 to generate another random 8-bit phase control signal (also constructed by four bit "1" and four bit "0") to the register 904. According to the 8-bit phase control signal stored at the register 904, the PWM controller 90 then outputs another four corresponding PWM signals, so as another corresponding four phase circuits are active for providing the four output currents (Io) to the CPU. Therefore, via the mechanism of randomly selecting the active/or inactive phase circuits when the multi-phase VRM of the present invention is operated in the light-load mode, the balance of the life hour of the devices in the eight phase circuits (410, 420, 430, 440, 450, 460, 470, 480) is achieved.

It is understood that the invention needs not be limited to the eight-phase VRM. The spirit of the present invention can be applied to any N-phase VRM.

Furthermore, it is understood that the invention needs not be limited to fixedly activate four phase circuits when the eight-phase VRM of the present invention is operated in the light-load mode. The number of the active phase circuits can be modulated according to the real CPU current consumed by the CPU. In other words, a relative large number of phase circuits in the present invention can be activated if the CPU current is relative high; and a relative small number of phase circuits in the present invention can be activated if the CPU current is relative low.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-phase voltage regulator module connected to a central processing unit and operated in one of a high-load mode and a low-load mode, comprising:
    a pulse-width-modulation controller generating a plurality of phase-width-modulation signals and a phase-control signal; and
    a plurality of phase circuits, each of which receives a corresponding one of the phase-width-modulation signals and generates a corresponding core voltage to the central processing unit;
    wherein a first portion of the phase circuits are activated when the multi-phase voltage regulator module is operated in the low-load mode at a first time, and, a second portion of the phase circuits are activated when the multi-phase voltage regulator module is operated in the low-load mode at a second time, wherein first portion and the second portion of the phase circuits are activated by the phase-control signal randomly, the first portion being non-identical to the second portion.

2. The multi-phase voltage regulator module according to claim 1, wherein all the phase circuits are activated when the multi-phase voltage regulator module is operated in the heavy-load mode.

3. The multi-phase voltage regulator module according to claim 1, wherein the first portion of the phase circuits are a half of the plurality of the phase circuits and the second portion of the phase circuits are the other half of the plurality of the phase circuits.

4. The multi-phase voltage regulator module according to claim 1, wherein the pulse-width-modulation controller further comprises a circuit capable of randomly generating the phase-control signal to determine the first portion of the phase circuits at the first time, and randomly updating the phase-control signal to determine the second portion of the phase circuits at the second time.

5. The multi-phase voltage regulator module according to claim 4, wherein the pulse-width-modulation controller further comprises a register for storing the phase-control signal.

6. The multi-phase voltage regulator module according to claim 1, further comprising a load detect circuit for comparing a central processing unit current with a reference current, wherein the multi-phase voltage regulator module is determined to operate in the heavy-load mode if a comparing result indicating the central processing unit current is greater than the reference current; and, the multi-phase voltage regulator module is determined to operate in the light-load mode if the comparing result indicating the central processing unit current is less than the reference current.

7. The multi-phase voltage regulator module according to claim 1, wherein each of the phase circuit further comprises:
    a pulse-width-modulation driver, for receiving the corresponding one of the phase-width-modulation signals and generating a first driving signal and a second driving signal; and
    a pulse-width-modulation circuit, for receiving the first driving signal and the second driving signal and generating a corresponding output current in response to the first driving signal and the second driving signal.

8. The multi-phase voltage regulator module according to claim 7, wherein the pulse-width-modulation driver further comprises:
    a steering logic circuit, for receiving the corresponding one of the phase-width-modulation signals and generating a first signal and a second signal; and
    two driving circuits, for respectively receiving the first signal and the second signal and generating the first driving signal and the second driving signal in response to the first signal and the second signal.

9. The multi-phase voltage regulator module according to claim 7, wherein the pulse-width-modulation circuit further comprises:
    an upper power field effect transistor comprising a drain connected to a voltage source and a gate to which the first driving signal is inputted;
    a lower power field effect transistor comprising a gate to which the second driving signal is inputted and a source connected to a ground;
    an output choke comprising a first end connected to a source of the upper power field effect transistor and a drain of the lower power field effect transistor;
    a current sense resistor coupled between a second end of the output choke and a core-voltage output end; and
    an output capacitor coupled between the core-voltage output end and the ground.

10. The multi-phase voltage regulator module according to claim 9, wherein the upper power field effect transistor and the lower power field effect transistor are a n-type field effect transistors.

11. A controlling method applied to a multi-phase voltage regulator module having a plurality of phase circuits connected to a central processing unit and capable of operating in one of a high-load mode and a low-load mode, the controlling method comprising steps of:
    activating a first portion of the phase circuits when the multi-phase voltage regulator module is operated in the low-load mode at a first time; and
    activating a second portion of the phase circuits when the multi-phase voltage regulator module is operated in the low-load mode at a second time;
    wherein the first portion is non-identical to the second portion, and the first portion and the second portion are activated randomly.

12. The control method according to claim 11, further comprising a step of activating all the phase circuits when the multi-phase voltage regulator module is operated in the heavy-load mode.

13. The control method according to claim 11, wherein the first portion of the phase circuits are a half of the plurality of the phase circuits and the second portion of the phase circuits are the other half of the plurality of the phase circuits.

14. The control method according to claim 11, further comprising a step of determining the multi-phase voltage regulator module is in either the heavy-load mode or the light-load mode according to a comparing result between a central processing unit current and a reference current.

* * * * *